United States Patent Office 2,983,628
Patented May 9, 1961

2,983,628

PROCESS FOR CONFERRING ANTISTATIC PROPERTIES TO DIELECTRIC PRODUCTS

Georg Hennemann, Velp, and Albertus Gerardus Lutgerhorst, Arnhem, Netherlands, assignors to American Enka Corporation, Enka, N.C., a corporation of Delaware No Drawing. Filed July 23, 1956, Ser. No. 599,308

Claims priority, application Netherlands Aug. 3, 1955

5 Claims. (Cl. 117—139.5)

This invention relates to a process for rendering antistatic products not conducting electricity, i.e., having dielectric properties, and to products treated according to said process.

In order to facilitate an understanding of the present invention, a simplified flow diagram of the process is given below:

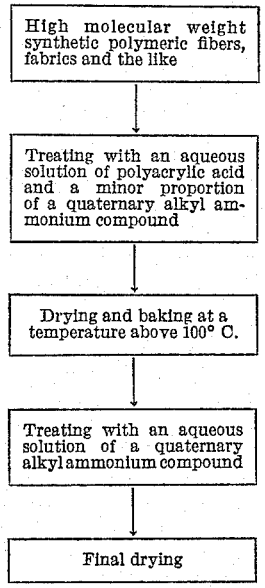

One of the principal objects of the present invention is to provide a new and improved method for treating non-electrically-conductive products, whether in the form of threads, fibers, foils, yarns, knitted and woven textile articles, etc., in such manner as to render them substantially completely antistatic.

A further object of the invention is to provide a method for treating such products for the purpose indicated in order to confer upon them antistatic properties that will persist despite subsequent treating operations to which the products may be subjected, such as washing, dyeing, etc.

A still further object of the invention is to provide improved dielectric products of the kind indicated that have been rendered substantially antistatic in accordance with the methods described herein, whereby their antistatic properties will remain after subsequent treating operations to which they may be subjected.

The manner in which these and other objects and features of the invention are attained will appear more fully from the following description thereof, in which reference is made to typical and preferred procedures in order to indicate more fully the nature of the invention, but without intending to limit the invention thereby.

Products not conducting electricity have the property that they become electrostatically charged during further processing and during use. These electrostatic charges, which may occur by rubbing the products against each other or by rubbing the products with other bodies, give rise to various disadvantages which may show themselves in different ways dependent upon the nature of the treatment or the use.

The electrostatically charged products may e.g. repel each other but they may also attract and hold dirt, dust, etc.

As examples of products not conducting electricity and which may be treated according to the process of the invention may be mentioned threads, fibers, cables, yarns, knitted and woven textile articles, as well as bristles, films, foils and products obtained by injection molding or by any other manner from synthetic hydrophobic polymers and copolymers, such as polyamides, polyesters and polyacrylonitrile derivatives. Furthermore, dielectric products manufactured from glass and porcelain may also be mentioned.

When an artificial thread or the like made from synthetic, hydrophobic polymers such as mentioned above is guided over guide means, such as guiding eyelets, guiding bars, thread brakes, etc. the friction that is unavoidably encountered creates charges upon the filaments and threads so that they repel each other thus giving rise to processing difficulties and sometimes even failures.

Staple fibers which must be spun to yarns can only with difficulty be carded due to the occurrence of electrostatic charges.

Even in ordinary use, hose or garments made from said threads or fibers attract dust and are very persistent in retaining said dust. Frequently runners and rugs retain dust and dirt so strongly that they cannot be cleaned by brushing, beating or vacuum cleaning.

To prevent the occurrence of static charges it has already been proposed to treat synthetic, hydrophobic threads, etc. with various preparations. However, since said preparations are more or less readily washed away the products treated therewith quite rapidly lose their antistatic property on dyeing or washing; and furthermore even without washing the antistatic effect diminishes substantially after a relatively short time.

In our prior copending U.S. application Serial No. 512,566, filed June 1, 1955, now Patent No. 2,936,249, there is described and claimed a process for rendering antistatic products not conducting electricity, the products being of the kind indicated above, in which process the products are treated with an aqueous solution of a polymeric, polyanion-active substance which, on being heated above 100° C., loses its solubility in water, whereupon the thus pretreated products are dried and subsequently heated above 100° C., the products being then treated with an aqueous solution of a cation-active soap and finally dried.

In order to apply on those products a stable antistatic layer, polymeric polyanion-active substances are used which, on being heated above 100° C., lose their solubility in water, and (as described in our aforesaid copending application) it is preferred to employ such substances as have carboxylic acid groups. Polyacrylic acid has proved to be very suitable.

Many variations are possible. For example, the first treating bath may be sprayed in warm condition, preferably at temperatures between 70 and 90° C., on the product to be treated or it may be applied to the product by means of suitable wetting rollers. Also an immersion process may be used. The products treated in this manner are subsequently dried at relatively low temperatures and thereupon baked at a temperature exceeding 100° C. This baking process is continued until the polyanion-active compound has become insoluble in water, but naturally not longer than is necessary to achieve that result in view of the possibility of discoloration and decomposition of the material if the heating is continued longer than necessary.

After baking, the products are then treated with an aqueous solution of a cation-active soap. It has been found that amongst others quaternary compounds, such as alkyl trimethyl ammonium compounds and alkyl pyridinium compounds, are suitable as cation-active soaps. Also quaternary compounds of sulphur, phosphorus, arsenic, antimony and, under special conditions, also of oxygen may be employed. Experiments have shown that the quaternary ammonium compound, stearyl trimethyl ammonium chloride, is particularly suitable.

The treatment with the second bath is carried out in the same manner as the treatment with the first bath. Preferably the treatment is carried out at low temperatures but, if desired, for example to avoid a clouding of the cation-active soap solution, the treatment is effected at 50° C. or higher.

Since the pre-heated and baked product has an acid reaction, it is preferred to bring the treating bath to the correct pH so as to obtain a final product of neutral reaction.

It was found that the reaction of the cation-active soap with the anion-groups on the baked product proceeds very rapidly.

In many cases it is preferred to remove the excess cation-active substance which has not reacted with the anion-active groups. It was found that this may be done satisfactorily by rinsing immediately after the treatment with the cation-active soap. Particularly in the case of textile materials, a rinsing after the treatment is very desirable.

The drying after the treatment thus described is done in a normal manner.

By means of this process it is possible to apply a stable anti-static layer on products not conducting electricity. A disadvantage of this process, however, is the fact that the resistance to mechanical rubbing or abrasion of the anti-static layer thus formed is not very high, and particularly not if this rubbing or abrasion takes place in an alkaline medium.

An explanation of this phenomenon may be that the anhydride groups formed from the carboxylic groups by the baking step are converted under the influence of the alkaline medium into corresponding alkali metal salts. These alkali metal salts may bring about a binding of water molecules thus causing the layer to swell. Consequently the adhesion of the still insoluble anti-static layer to the treated material may become smaller so that this layer has less resistance to mechanical treatment, such as rubbing, wringing and the like. However, it is to be understood that we do not wish to be bound by any particularly theory or reaction mechanism. On the contrary, it is a still further and specific object of the present invention to contribute to the art a highly desirable and important refinement and improvement over the process described in our prior copending application above referred to, and the disclosure of which, for convenience and brevity, is to be regarded as incorporated herein by reference.

According to the present invention, it has been discovered that the stability of the anti-static layer with respect to mechanical rubbing or abrasion in wet condition becomes much more favorable if a cation-active substance is added to the aqueous solution of the polymeric, polyanion-active substance. However, the cation-active substance should be added only to such an extent (at most) that in the resulting mixture of the polymeric polyanion-active substance and the cation-active substance no inconvenient and undesirable deposit or precipitate is formed. It appears that the cation-active substance reacts with the polymeric polyanion-active substance with the formation of a complex which however does not precipitate so long as there is still a sufficient surplus of the polymeric polyanion-active substance available in the solution.

During the drying and baking operation described above, this complex is converted into an insoluble compound which, even under the influence of alkaline detergents, cannot be converted into a corresponding alkali salt.

Consequently when operating according to the improved invention of the present application, an antistatic layer is formed on the product undergoing treatment, which layer not only remains permanently insoluble but, moreover, has a high resistance to mechanical treatment even in an aqueous alkaline medium.

The amount of the cation-active substance which is to be added to the first treating bath containing the polymeric polyanion-active substance is relatively small and may be conveniently and readily determined by simple orientation tests which are easy to carry out. It has been discovered that different cation-active substances are preferably used in different concentrations relative to the concentration of the polymeric polyanion-active substance. As stated above, a too large amount of the cation-active substance causes an inconvenient and undesirable deposit and this forms the basis for the test to determine the optimum amount to be employed. The three working examples set forth below illustrate various embodiments of the invention in which 0.75%, 0.55%, and 1%, respectively, of the cation-active substance, based on the polymeric polyanion-active substance, is employed. However, these ratios may be departed from to a considerable extent, for example from about 0.5% to about 5%, depending upon the particular cation-active substance chosen and provided always that the ratios are maintained below the ratio which for any particular combination of ingredients leads to the formation of the undesirable deposit or precipitate referred to above.

In order to indicate still more fully the nature of the present invention, the following examples of typical procedures are set forth, it being understood that this description is presented by way of illustration only, and not as limiting the scope of the invention.

*Example I*

A previously cleaned fabric of synthetic linear polyamide, formed from the polycondensation of adipic acid and hexamethylene diamine, was soaked on a triple-roller device in a solution of 4.0% by weight of polyacrylic acid and 0.03% by weight of stearyl trimethyl ammonium chloride in water. The temperature of the solution was 80° C. The pressing out effect was about 40%. After drying, the fabric was heated on a tenter for a period of 20 seconds at 220° C. In this way the baking of the antistatic layer and the stabilizing of the polyamide fabric was combined in one processing step. Thereupon the fabric was impregnated on a triple-roller device with an aqueous weakly alkaline solution of 1.0% by weight of stearyl trimethyl ammonium chloride at 80° C. The pressing-out effect was about 40%. Thereafter the fabric was rinsed and finally dried on a tenter.

*Example II*

In a manner analogous to that of Example I a fabric consisting of a synthetic linear polyamide obtained by the polymerization of ε-caprolactam was treated; however, as a first bath an aqueous solution was used which contained 5.4% by weight of polyacrylic acid and 0.03% by weight of stearyl dimethyl benzyl ammonium chloride and as a second bath a solution of 1% by weight of stearyl dimethyl benzyl ammonium chloride was used, the baking being carried out for a period of 20 seconds at 190° C.

After repeated washing in a bath containing 0.3% by weight of Marseille soap, during which mechanical rubbing was applied, the two sample pieces obtained from the Examples I and II procedures did not show any appreciable decrease in their antistatic properties.

*Example III*

An amount of 10 kg. of synthetic linear polyamide fiber (having a titre of 4.5 denier and a staple length of 110 mm.) was introduced into an aqueous solution containing 4.0% by weight of polyacrylic acid and 0.04% by weight of stearyl dimethyl benzyl ammonium chloride. The temperature of the bath was 80° C. The bath ratio was 1:16 and the fiber mass was treated while agitating for a period of 15 minutes. Thereafter the fiber mass was centrifuged down to a moisture content of about 20%. Thereupon the fiber mass was dried for two hours in well-opened and distributed condition at 60° C. and finally it was baked for 20 min. at 140° C.

The fibers thus processed were treated while agitating for 15 minutes in a second weakly alkaline bath containing 0.5% by weight of stearyl dimethyl benzyl ammonium chloride. The temperature of the bath amounted to 45° C. and the bath ratio was 1:16. Thereafter the fiber mass was centrifuged, carefully rinsed, centrifuged again and finally dried at 60° C.

The polyamide fiber thus obtained showed excellent carding properties and could be readily worked up into yarns, semi-finished and finished products. The articles thus produced were practically free of the disadvantage of attracting and holding dirt and dust.

The layer applied to the fiber surface in this manner could not be washed off by treatment with hot water, hot dilute acids or hot alkaline soap solutions. The layer provided on the fiber surface was also resistant to the usual treatments such as dyeing, washing, etc.

While specific examples of preferred methods and products embodying the present invention have been described above, it will be apparent that many changes and modifications may be made in the methods of procedure and products without departing from the spirit of the invention. It will therefore be understood that the examples cited and the methods and products set forth above are intended to be illustrative only, and are not intended to limit the invention.

What is claimed is:

1. In a process for imparting antistatic properties to high molecular weight synthetic polymeric fibers and fabrics made therefrom in which they are treated with an aqueous solution of polyacrylic acid at a temperature less than 100° C., thereafter drying them, subsequently heating them to an elevated temperature above 100° C., then treating them with an aqueous solution of a quaternary alkyl ammonium compound and finally drying them, the improvement comprising incorporating in the aqueous solution of polyacrylic acid about 0.5% to about 5.0% of a quarternary alkyl ammonium compound, based on the weight of the polyacrylic acid.

2. A process according to claim 1 wherein the fibers and fabrics are composed of a high molecular weight synthetic polymer selected from the group consisting of polyamides, polyesters, and acrylonitrile polymers.

3. A process according to claim 1 wherein the quarternary alkyl ammonium compound is an alkyl trimethyl ammonium compound.

4. A process according to claim 1 wherein the quarternary alkyl ammonium compound is stearyl trimethyl ammonium chloride.

5. A process according to claim 1 wherein the quarternary alkyl ammonium compound is stearyl dimethyl benzyl ammonium chloride.

References Cited in the file of this patent

UNITED STATES PATENTS

| | | |
|---|---|---|
| 2,168,535 | Nuesslein et al. | Aug. 8, 1939 |
| 2,253,146 | Spanagel | Aug. 19, 1941 |
| 2,343,095 | Smith | Feb. 29, 1944 |
| 2,421,363 | Young | May 27, 1947 |
| 2,500,122 | Dixon et al. | Mar. 7, 1950 |
| 2,868,668 | Caroselli et al. | Jan. 13, 1959 |
| 2,930,106 | Wrotnowski | Mar. 29, 1960 |
| 2,936,249 | Hennemann et al. | May 10, 1960 |